United States Patent
Huang et al.

(10) Patent No.: US 9,805,501 B2
(45) Date of Patent: Oct. 31, 2017

(54) IMAGE RENDERING METHOD AND APPARATUS

(71) Applicant: Huawei Technologies Co., Ltd., Shenzhen (CN)

(72) Inventors: Chuanna Huang, Shenzhen (CN); Jing Xiao, Shenzhen (CN); Guangyao Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/157,679

(22) Filed: May 18, 2016

(65) Prior Publication Data

US 2016/0267710 A1   Sep. 15, 2016

Related U.S. Application Data

(63) Continuation of application No. PCT/CN2014/076117, filed on Apr. 24, 2014.

(30) Foreign Application Priority Data

Nov. 19, 2013 (CN) .......................... 2013 1 0585395

(51) Int. Cl.
*H04N 7/14* (2006.01)
*G06T 15/50* (2011.01)
(Continued)

(52) U.S. Cl.
CPC ............. *G06T 15/506* (2013.01); *H04N 7/15* (2013.01); *H04N 9/646* (2013.01)

(58) Field of Classification Search
USPC .......................................... 348/14.01–14.09
See application file for complete search history.

(56) References Cited

U.S. PATENT DOCUMENTS 6,980,697 B1 * 12/2005 Basso ..................... G06T 15/50
                                                    348/14.01
8,155,386 B2 *  4/2012 Sim ......................... G06T 7/50
                                                    382/106
(Continued)

FOREIGN PATENT DOCUMENTS

CN         1926851 A    3/2007
CN       101383912 A    3/2009
(Continued)

OTHER PUBLICATIONS

Partial English Translation and Abstract of Chinese Patent Application No. CN103606182, May 5, 2016, 2 pages.
(Continued)

*Primary Examiner* — Maria El-Zoobi
(74) *Attorney, Agent, or Firm* — Conley Rose, P.C.

(57) ABSTRACT

An image rendering method and apparatus where the method includes recognizing a target area from a to-be-rendered image, setting a virtual light source for the target area, and performing rendering on the target area using the virtual light source. When rendering is performed on the to-be-rendered image, the rendering performed on the to-be-rendered image is implemented using the virtual light source. The virtual light source plays a rendering action only on the target area corresponding to the virtual light source, and does not affect another part of the to-be-rendered image, and therefore an image effect of the to-be-rendered image may be relatively good.

18 Claims, 7 Drawing Sheets

(51) Int. Cl.
*H04N 7/15* (2006.01)
*H04N 9/64* (2006.01)

(56) References Cited

U.S. PATENT DOCUMENTS

| | | | | |
|---|---|---|---|---|
| 8,285,033 | B2* | 10/2012 | Das Gupta | G06T 5/002 348/272 |
| 2003/0034974 | A1* | 2/2003 | Welch | G06T 13/20 345/426 |
| 2003/0202120 | A1 | 10/2003 | Mack | |
| 2005/0157204 | A1 | 7/2005 | Marks | |
| 2009/0231425 | A1* | 9/2009 | Zalewski | H04N 7/18 348/142 |
| 2010/0097476 | A1* | 4/2010 | Marks | H04N 5/272 348/169 |
| 2011/0007073 | A1 | 1/2011 | Belt et al. | |
| 2011/0115886 | A1* | 5/2011 | Nguyen | H04N 13/025 348/47 |
| 2011/0234591 | A1 | 9/2011 | Mishra et al. | |
| 2012/0050254 | A1 | 3/2012 | Gordin et al. | |
| 2012/0120071 | A1* | 5/2012 | Thorn | G06T 17/00 345/420 |
| 2016/0267710 | A1* | 9/2016 | Huang | G06T 15/506 |

FOREIGN PATENT DOCUMENTS

| | | |
|---|---|---|
| CN | 101971211 A | 2/2011 |
| CN | 102201032 A | 9/2011 |
| CN | 103155004 A | 6/2013 |
| CN | 103606182 A | 2/2014 |

OTHER PUBLICATIONS

Gunawardane, P., et al., "Invisible Light: Using Infrared for Video Conference Relighting," Proceedings of IEEE 17th International Conference on Image Processing, Sep. 26-29, 2010, 4 pages.

Kondori, F., et al., "3D Head Pose Estimation Using the Kinect," International Conference on Wireless Communications and Signal Processing (WCSP), Nov. 9-11, 2011, 4 pages.

Okabe, M., et al., "Single-View Relighting with Normal Map Painting," Jul. 2008, 8 pages.

Foreign Communication From a Counterpart Application, PCT Application No. PCT/CN2014/076117, English Translation of International Search Report dated Aug. 29, 2014, 2 pages.

Foreign Communication From a Counterpart Application, PCT Application No. PCT/CN2014/076117, English Translation of Written Opinion dated Aug. 29, 2014, 10 pages.

Foreign Communication From a Counterpart Application, European Application No. 14863897.6, Extended European Search Report dated Oct. 11, 2016, 9 pages.

Foreign Communication From a Counterpart Application, Chinese Application No. 201310585395.1, Chinese Office Action dated Oct. 28, 2015, 6 pages.

* cited by examiner

IMAGE RENDERING METHOD AND APPARATUS

CROSS-REFERENCE TO RELATED APPLICATIONS

This application is a continuation of International Application No. PCT/CN2014/076117, filed on Apr. 24, 2014, which claims priority to Chinese Patent Application No. 201310585395.1, filed on Nov. 19, 2013, both of which are hereby incorporated by reference in their entireties.

TECHNICAL FIELD

The present disclosure relates to the image processing field, and in particular, to an image rendering method and apparatus.

BACKGROUND

A video conference system is a multimedia system in which information, such as voice, an image, and data, is integrated together for long-distance transmission. The video conference system generally includes a video conference server and a terminal device that is installed in each conference room, where the terminal device may include a camera device, a display device, and the like. A terminal device in a local conference room may capture local information, such as a local sound or a local image, from the local conference room, and sends the local information to the video conference server. After performing corresponding processing on the local information, the video conference server sends the local information to a terminal device in each remote conference room. Afterwards, the terminal device in the remote conference room displays the received local information in the remote conference room. When conference participants located in two or more different locations perform remote communication using the video conference system, they not only can hear a sound of a counterpart, but also can see an image of the counterpart, which make the remote communication have a sense of reality, intimacy, and presence.

As video conference technologies develop, a conference participant has an increasingly high requirement on an image effect of a local image. For example, the conference participant generally expects that an image of the conference participant in the local image presents a stereoscopic effect, and the like in order to increase the sense of reality during communication. In the prior art, an enhancement on an image effect of a local image is mainly implemented by enhancing a lighting effect of a local conference room. Common practice is that different types of light sources are arranged at different angles according to a location of a conference participant in a local conference room. Multiple light sources are used to cooperatively provide lighting for the conference participant in the conference room. The conference participant is highlighted in a local image by means of a lighting effect such that the local image has a relatively good image effect. For example, a soft light source, such as a tricolor soft light, is used in the conference room for basic lighting, and a hard light source, such as a spotlight, is used for backlighting or used as a main light for lighting such that an image of the conference participant in the local image can be separated from a background area and can present a stereoscopic sense. In this way, the local image presents a relatively good stereoscopic effect.

When an effect of a local image is enhanced using the prior art, if there are multiple conference participants, a location of each of the conference participants needs to be considered during light source setting, and light source setting is extremely complex. Complex light source setting easily causes mutual interference between different light sources, thereby affecting a lighting effect of a local conference room, and causing a poor effect of the local image.

SUMMARY

Embodiments of the present disclosure provide an image rendering method and apparatus in order to solve a problem that when an effect of a local image is enhanced using the prior art, complex light source setting in a local conference room easily causes a poor effect of the local image.

According to a first aspect, an embodiment of the present disclosure provides an image rendering method, where the method includes recognizing a target area from a to-be-rendered image, setting a virtual light source for the target area, and performing rendering on the target area using the virtual light source.

With reference to the first aspect, in a first possible implementation manner, setting a virtual light source for the target area includes acquiring depth information of the target area, and setting the virtual light source for the target area according to the depth information.

With reference to the first possible implementation manner of the first aspect, in a second possible implementation manner of the first aspect, before recognizing a target area from a to-be-rendered image, the method further includes acquiring the to-be-rendered image that includes the depth information.

With reference to the second possible implementation manner of the first aspect, in a third possible implementation manner of the first aspect, acquiring the to-be-rendered image that includes the depth information includes cooperatively acquiring, using a depth camera and a color camera, the to-be-rendered image that includes the depth information.

With reference to the first possible implementation manner of the first aspect, in a fourth possible implementation manner of the first aspect, acquiring depth information of the target area includes obtaining the depth information of the target area by means of calculation according to a color of the to-be-rendered image.

With reference to the first possible implementation manner of the first aspect, the second possible implementation manner of the first aspect, the third possible implementation manner of the first aspect, or the fourth possible implementation manner of the first aspect, in a fifth possible implementation manner of the first aspect, setting the virtual light source for the target area according to the depth information includes selecting, for each target area, a location within a preset location range corresponding to depth information of the target area as a location of the virtual light source, and selecting, for each target area, an illuminance ratio within a preset ratio range corresponding to the depth information of the target area as an illuminance ratio of the virtual light source.

With reference to the fifth possible implementation manner of the first aspect, in a sixth possible implementation manner of the first aspect, performing rendering on the target area using the virtual light source includes generating, for a target pixel of the target area, a gain factor under an action of the virtual light source, performing rendering on an initial color of the target pixel using the gain factor in order to obtain a rendered color of the target pixel, and replacing the initial color of the target pixel with the rendered color.

With reference to the sixth possible implementation manner of the first aspect, in a seventh possible implementation manner of the first aspect, generating, for a target pixel of the target area, a gain factor under an action of the virtual light source includes generating a gain factor $$K * \frac{1}{d^2} * k'(1 - \cos\theta)$$

for the target pixel when there is one virtual light source, where K represents an illuminance ratio of the virtual light source, d represents depth information of the target pixel, k' represents a light ratio of the target area, and θ represents an incident angle.

With reference to the sixth possible implementation manner of the first aspect, in an eighth possible implementation manner of the first aspect, generating, for a target pixel of the target area, a gain factor under an action of the virtual light source includes generating, for the target pixel, a sub-gain factor under an action of each of the virtual light sources using a formula $$K * \frac{1}{d^2} * k'(1 - \cos\theta)$$

when there are multiple virtual light sources, where K represents an illuminance ratio of the virtual light source, d represents depth information of the target pixel, k' represents a light ratio of the target area, and θ represents an incident angle, and using a product of the sub-gain factors as the gain factor of the target pixel.

With reference to the sixth possible implementation manner of the first aspect, the seventh possible implementation manner of the first aspect, or the eighth possible implementation manner of the first aspect, in a ninth possible implementation manner of the first aspect, performing rendering on an initial color of the target pixel using the gain factor in order to obtain a rendered color of the target pixel includes acquiring, for each target pixel, an initial color of the target pixel, generating a color component corresponding to the initial color, performing rendering on the color component of the target pixel using the gain factor in order to obtain a rendered component of the target pixel, and generating a rendered color of the target pixel using the rendered component of the target pixel.

According to a second aspect, an embodiment of the present disclosure further provides an image rendering apparatus, where the image rendering apparatus includes a recognizing unit configured to recognize a target area from a local image, a setting unit configured to set a virtual light source for the target area recognized by the recognizing unit, and a rendering unit configured to perform rendering on the target area using the virtual light source set by the setting unit.

With reference to the second aspect, in a first possible implementation manner, the setting unit includes a depth acquiring subunit configured to acquire depth information of the target area, and a light source setting subunit configured to set the virtual light source for the target area according to the depth information acquired by the depth acquiring subunit.

With reference to the first possible implementation manner of the second aspect, in a second possible implementation manner of the second aspect, the apparatus further includes an acquiring unit configured to acquire the local image that includes the depth information.

With reference to the second possible implementation manner of the second aspect, in a third possible implementation manner of the second aspect, the acquiring unit is configured to cooperatively acquire, using a depth camera and a color camera, the local image that includes the depth information.

With reference to the first possible implementation manner of the second aspect, in a fourth possible implementation manner of the second aspect, the depth acquiring subunit is configured to obtain the depth information of the target area by means of calculation according to a color of the local image.

With reference to the first possible implementation manner of the second aspect, the second possible implementation manner of the second aspect, the third possible implementation manner of the second aspect, or the fourth possible implementation manner of the second aspect, in a fifth possible implementation manner of the second aspect, the light source setting subunit includes a location setting subunit configured to select a location within a preset location range corresponding to the depth information as a location of the virtual light source, and an illuminance ratio setting subunit configured to select an illuminance ratio within a preset ratio range corresponding to the depth information as an illuminance ratio of the virtual light source.

With reference to the fifth possible implementation manner of the second aspect, in a sixth possible implementation manner of the second aspect, the rendering unit includes a gain factor generating subunit configured to generate, for a target pixel of the target area, a gain factor under an action of the virtual light source, a color generating subunit configured to perform rendering on an initial color of the target pixel using the gain factor generated by the gain factor generating subunit in order to obtain a rendered color of the target pixel, and a color replacing subunit configured to replace the initial color of the target pixel with the rendered color generated by the color generating subunit.

With reference to the sixth possible implementation manner of the second aspect, in a seventh possible implementation manner of the second aspect, the gain factor generating subunit is configured to generate a gain factor $$K * \frac{1}{d^2} * k'(1 - \cos\theta)$$

for the target pixel when there is one virtual light source, where K represents an illuminance ratio of the virtual light source, d represents depth information of the target pixel, k' represents a light ratio of the target area, and θ represents an incident angle.

With reference to the sixth possible implementation manner of the second aspect, in an eighth possible implementation manner of the second aspect, the gain factor generating subunit includes a sub-gain factor generating subunit, configured to generate, for the target pixel, a sub-gain factor under an action of each of the virtual light sources using a formula $$K * \frac{1}{d^2} * k'(1 - \cos\theta)$$

when there are multiple virtual light sources, where K represents an illuminance ratio of the virtual light source, d represents depth information of the target pixel, k' represents a light ratio of the target area, and θ represents an incident angle, and a gain factor calculating subunit configured to use a product of the sub-gain factors generated by the sub-gain factor generating subunit as the gain factor of the target pixel.

With reference to the sixth possible implementation manner of the second aspect, the seventh possible implementation manner of the second aspect, or the eighth possible implementation manner of the second aspect, in a ninth possible implementation manner of the second aspect, the color generating subunit includes an initial color acquiring subunit configured to acquire the initial color of the target pixel, a color component generating subunit configured to generate a color component corresponding to the initial color acquired by the initial color acquiring subunit, a rendered-component generating subunit configured to perform, using the gain factor, rendering on the color component generated by the color component generating subunit in order to obtain a rendered component of the target pixel, and a rendered-color generating subunit configured to generate the rendered color of the target pixel using the rendered component that is of the target pixel and is generated by the rendered-component generating subunit.

In the embodiments of the present disclosure, a target area is recognized from a local image, a virtual light source is set for the target area, and rendering is performed on the target area using the virtual light source. An enhancement on a to-be-rendered image is implemented using a virtual light source. Therefore, the virtual light source plays a rendering action only on a target area corresponding to the virtual light source, but does not affect another part of the to-be-rendered image. Virtual light sources that are set for different target areas do not interfere with each other, and therefore an image effect of the to-be-rendered image can be relatively good.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts. According to the accompanying drawings, the foregoing objectives, other objectives, features, and advantages of the present disclosure will be clearer. In all the accompanying drawings, a same reference numeral denotes a same part. The drawings are not deliberately drawn to scale according to an actual size and the like, and a focus lies in highlighting the subject of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, an image on which rendering processing needs to be performed is referred to as a to-be-rendered image. An image rendering method in the embodiments of the present disclosure may be applied to a scenario in which rendering is performed on a picture or a video. When rendering is performed on a picture, the to-be-rendered image is the picture, and when rendering is performed on a video, the to-be-rendered image may be each frame of image of the video. Rendering on the video is implemented by performing image rendering on each frame of image of the video.

The image rendering method in the embodiments of the present disclosure may be applied to a video conference system, or may be applied to another scenario in which rendering processing needs to be performed on an image. When the image rendering method in the embodiments of the present disclosure is applied to the video conference system, the to-be-rendered image may be a local image. The local image may be a picture that is captured by a terminal device from a local conference room, or may be any frame of image of a video that is captured by a terminal device from a local conference room. In this case, the image rendering method in the embodiments of the present disclosure may be applied to a terminal device in a local conference room, a video conference server, or a terminal device in a remote conference room.

The to-be-rendered image in the image rendering method in the embodiments of the present disclosure is a pixel map. When the picture on which rendering needs to be performed or each frame of image on which rendering needs to be performed in the video is not a pixel map, first, the picture on which rendering needs to be performed or each frame of image on which rendering needs to be performed in the video may be converted into a pixel map, and then rendering processing is performed using the image rendering method in the embodiments of the present disclosure.

Figure 1:
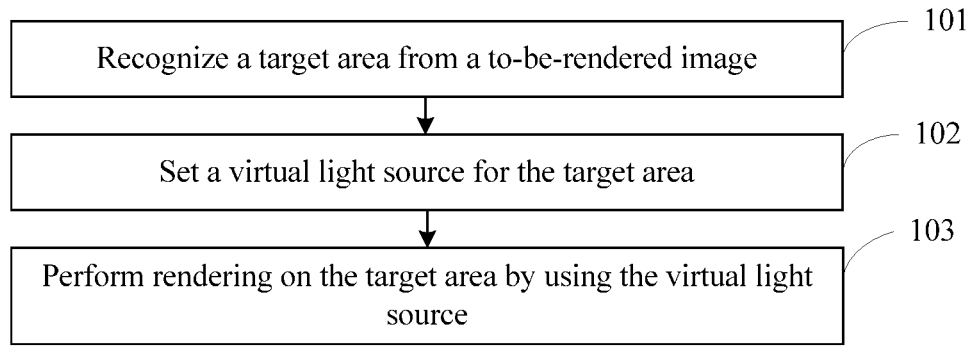
FIG. 1 is a flowchart of an image rendering method according to an embodiment of the present disclosure.

Referring to FIG. 1, FIG. 1 is a flowchart of an embodiment of an image rendering method according to the present disclosure, where the method includes the following steps.

Step 101: Recognize a target area from a to-be-rendered image.

Because the to-be-rendered image is generally an image obtained by photographing a target object, the to-be-rendered image may generally include a target area and a background area. The target area refers to an image of the target object in the to-be-rendered image, and is generally content that needs to be highlighted in the to-be-rendered image. The background area refers to an image of another part except the target area in the to-be-rendered image. Because an image effect of the target area has relatively great impact on an image effect of the to-be-rendered image, but an image effect of the background area has relatively small impact on the image effect of the to-be-rendered image, to enhance the to-be-rendered image is mainly to enhance the target area. Therefore, after the to-be-rendered image is acquired, the target area in the to-be-rendered image needs to be determined first.

There may be multiple methods for recognizing the target area from the to-be-rendered image. In a practical application, the target area may be recognized from the to-be-rendered image using an image recognition algorithm with reference to an application environment. For example, a face image may be recognized from an input image using a face recognition algorithm, and then the face image is used as the target area. Alternatively, the target area may be directly recognized from the to-be-rendered image according to a preset condition. For example, a part whose image color is a specified color in the to-be-rendered image is determined as the target area.

A to-be-rendered image may include an image of one or more target objects, and therefore, there may be one or more target areas recognized from the to-be-rendered image in this step. When multiple target areas are recognized from the to-be-rendered image, each of the target areas may be recognized using the foregoing methods for recognizing the target area.

Step 102: Set a virtual light source for the target area.

The image effect of the target area is determined by a color of the target area. Rendering performed on the to-be-rendered image may be implemented by setting the virtual light source for the target area, and then by performing rendering on the color of the target area using the virtual light source.

When the virtual light source is set for the target area, a location of the virtual light source and an illuminance ratio of the virtual light source mainly need to be determined. The location of the virtual light source refers to a relative location between the virtual light source and the target area, and the illuminance ratio of the virtual light source refers to a ratio of illuminance of the virtual light source to illuminance of the target area.

In a possible implementation manner, setting the virtual light source for the target area may include acquiring depth information of the target area, and setting the virtual light source for the target area according to the depth information. A point in space is selected as a reference point. In a coordinate system (X, Y, Z) established using the reference point, if a plane on which the target area is located is parallel with a (X, Y) plane, the depth information of the target area is a spatial coordinate Z of the target area. For example, a photographing point of a camera may be selected as the reference point. In a coordinate system of the camera, a straight line that is perpendicular to an imaging plane and passes through a mirror plane center is used as a Z axis. If coordinates of an object in the camera coordinate system is (X, Y, Z), a value of Z is depth information of the object on the imaging plane of the camera. There are multiple specific methods for setting the virtual light source for the target area according to the depth information. For example, a location may be selected within a preset location range corresponding to the depth information as the location of the virtual light source, and an illuminance ratio may be selected within a preset ratio range corresponding to the depth information as the illuminance ratio of the virtual light source.

The depth information of the target area includes depth information of each target pixel constituting the target area. The depth information of the target area may be obtained by means of calculation according to a color of the to-be-rendered image, and a specific calculation process is not further described herein. In order to increase a processing speed, when a to-be-rendered image is to be acquired, a to-be-rendered image that includes pixel depth information may be directly acquired. For example, the to-be-rendered image that includes the pixel depth information may be cooperatively acquired using a color camera and a depth camera. The depth information of the target area may be directly acquired from the to-be-rendered image when the to-be-rendered image includes the pixel depth information.

Because the depth information of the target area can not only reflect a shape feature of the target object, but also reflect a distance and an angle that are between the target object and an imaging plane during imaging of the to-be-rendered image, an effect of the to-be-rendered image may be better enhanced by setting the virtual light source according to the depth information of the target area.

In another possible implementation manner, setting the virtual light source for the target area may include acquiring a location of the virtual light source and an illuminance ratio of the virtual light source that are manually set by a skilled person. When manually setting the location of the virtual light source and the illuminance ratio of the virtual light source, the skilled person may also refer to the depth information of the target area.

In a practical application, one or more virtual light sources may be set for the target area according to a requirement. The virtual light source may be a virtual point light source, or may be virtual parallel light, or the like. When multiple virtual light sources are set, a location and an illuminance ratio of each of the virtual light sources may be set according to the foregoing method. When there are multiple target areas in the to-be-rendered image, a virtual light source may be separately set for each of the target areas, or a common virtual light source may be set for all the target areas. Separately setting a virtual light source for each of the target areas may better enhance a stereoscopic sense of each of the target areas, and setting a common virtual light source for multiple target areas may enhance a sense of reality of the entire to-be-rendered image.

Step 103: Perform rendering on the target area using the virtual light source.

The target area includes target pixels, and therefore, the image effect of the target area is determined by a color of each target pixel. Changing the color of each target pixel may change the image effect of the target area, and then change the image effect of the to-be-rendered image. Changing the color of the target pixel may be implemented using the virtual light source. The virtual light source is used to perform rendering on the color of each target pixel constituting the target area such that colors of all pixels of the to-be-rendered image are changed to different degrees, thereby generating an effect of adding a light source for the target object, and changing the image effect of the target area.

To perform rendering on the target area, rendering may be performed on the target pixels one by one using the virtual light source. Performing rendering on the target pixels using the virtual light source may include the following steps: generating, for the target pixel constituting the target area, a gain factor under an action of the virtual light source, performing rendering on an initial color of the corresponding target pixel using the gain factor in order to obtain a rendered color of the target pixel, and replacing the initial color of the target pixel with the rendered color corresponding to the target pixel in order to obtain an enhanced image. By performing rendering, the colors of the target pixels are changed to different degrees, and the image effect of the target area is changed, thereby achieving a purpose of enhancing the effect of the to-be-rendered image.

When a gain factor is generated for a target pixel, if there are multiple virtual light sources, a sub-gain factor may be generated under an action of each of the virtual light sources for the target pixel first, and then a product of the sub-gain factors is used as the gain factor of the target pixel, or if there is one virtual light source, a sub-gain factor of the target pixel under an action of the virtual light source is the gain factor generated for the target pixel.

It can be seen from the foregoing embodiment that, a target area is recognized from a to-be-rendered image. A virtual light source is set for the target area, and rendering is performed on the target area using the virtual light source. An enhancement on a to-be-rendered image is implemented using a virtual light source. Therefore, the virtual light source plays a rendering action only on a target area corresponding to the virtual light source, but does not affect another part of the to-be-rendered image. Virtual light sources that are set for different target areas do not interfere with each other, and therefore an effect of the to-be-rendered image can be relatively good.

In addition, by improving the effect of the to-be-rendered image using this embodiment, unlike in the prior art, it is not necessary to arrange light sources of different types at different angles of a local conference room, but only a diffuse light source may be used to provide basic lighting for the local conference room in order to simplify a requirement of light source setting of the local conference room. By providing basic lighting for the local conference room using only the diffuse light source, use of a hard light source, such as a spotlight, in the conference room may be reduced, and a possibility that high heat and a high brightness of the light source cause a conference participant to feel uncomfortable is reduced.

The following further describes the image rendering method in this embodiment of the present disclosure using an example that this embodiment of the present disclosure is applied to a video conference system and the to-be-rendered image is a local image. The image rendering method in this embodiment of the present disclosure may be applied to a terminal device in a local conference room, a video conference server, or a terminal device in a remote conference room.

Figure 2A:
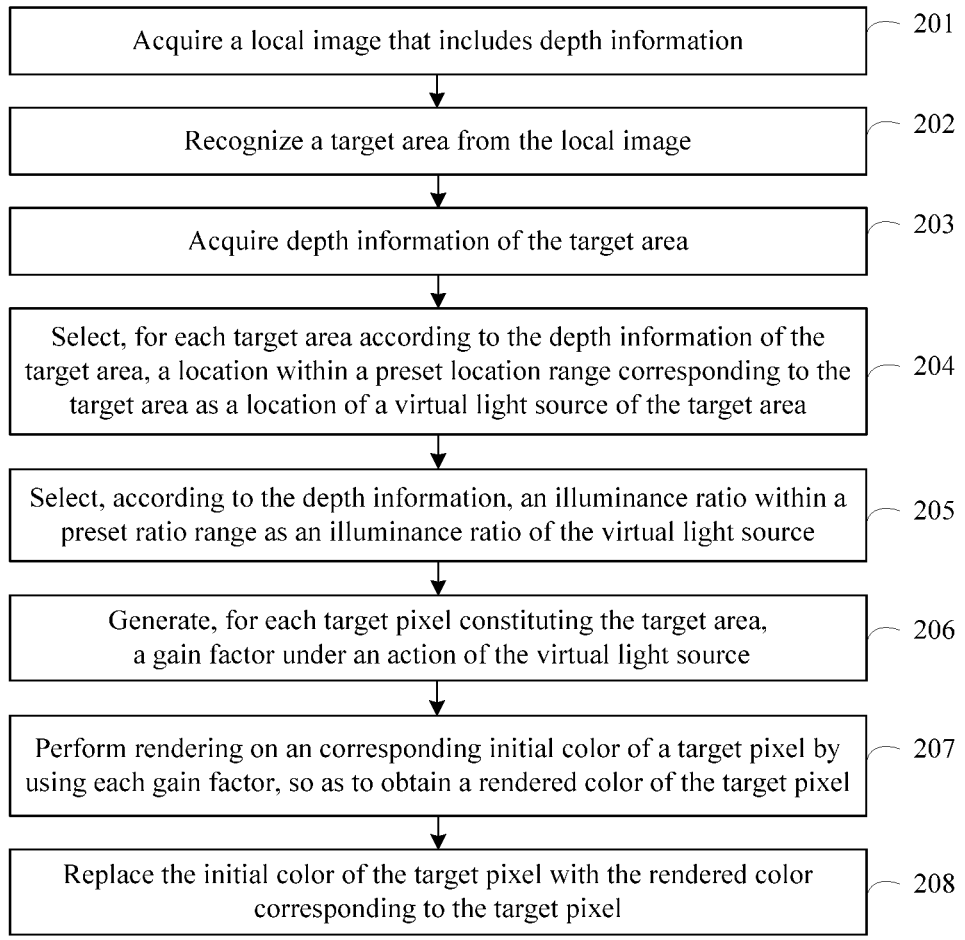
FIG. 2A is a flowchart of another image rendering method according to an embodiment of the present disclosure.

Referring to FIG. 2A, FIG. 2A is a flowchart of another embodiment of an image rendering method according to the present disclosure, and this embodiment describes in detail a process of enhancing a local image using a virtual light source.

Figure 2B:
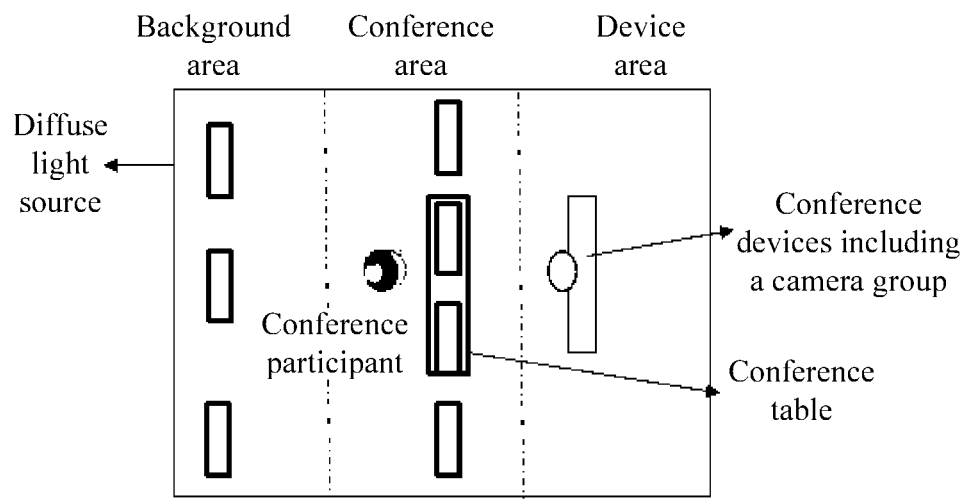
FIG. 2B is a schematic diagram of an arrangement manner of a local conference room in an image rendering method according to another embodiment of the present disclosure.

The image rendering method in this embodiment of the present disclosure may be applied to a scenario in which lighting is arranged in a local conference room in the following manner. As shown in FIG. 2B, the local conference room may be divided into three areas: a device area, a conference area, and a background area. The device area is a terminal device installation area, and terminal devices including a camera device are installed in this area, where the camera device may include a depth information camera and a color camera. The conference area is a seat area for a conference participant. The background area is an area that is from space behind the conference participant to a background wall. Environment lighting may be arranged in the local conference room in the following manner. Lighting is not arranged in the device area, a diffuse light source is installed on a ceiling of the conference area such that illuminance of the conference area is 300-500 lux in order to provide basic lighting for the conference area and create an environment of even lighting, and a diffuse area whose illuminance is 70-80% illuminance of the conference area is created in the background area according to an actual size of the conference room.

Step 201: Acquire a local image that includes depth information.

In a video conference, the local image that includes the depth information may be cooperatively acquired using a camera group that includes a color camera and a depth information camera. The depth information camera and the color camera have same pixel resolution and have a consistent visual angle. The color camera outputs a color image, and the color image includes a color of each pixel. The depth information camera outputs a depth map, and the depth map includes depth information of each pixel. The local image that includes the depth information includes the color image that is output by the color camera and the depth map that is output by the depth information camera. Each pixel in the local image that includes the depth information has three-dimensional coordinates, which are a horizontal coordinate and a vertical coordinate of the pixel that are in the color image, and depth information of the pixel. Therefore, it may be considered that each pixel corresponds to a spatial point in three-dimensional space. Because each pixel in the local image has depth information, a relative location between the local image and the spatial point corresponding to each pixel may be determined according to the depth information.

Step 202: Recognize a target area from the local image.

In the video conference, rendering performed on the local image is generally intended to enhance a stereoscopic sense of a face image in the local image. Therefore, the face image may be recognized from the local image according to a face recognition algorithm, and the recognized face image is used as the target area. When the local image includes multiple face images, each of the face images may be used as a target area. In a practical application, each of the face images may be recognized as a target area, or at least one face image of the face images may be recognized as a target area, which is not limited herein. If a stereoscopic sense or the like of another object needs to be enhanced, the target area may also be recognized from the local image using a corresponding recognition algorithm, and a specific process is not further described herein.

Step 203: Acquire depth information of the target area.

The depth information of the target area includes depth information of target pixels. Because the target pixels are pixels of the local image, depth information of each of the target pixels may be acquired from the local image in order to determine depth information of each target area.

Step 204: Select, for each target area, a location within a preset location range corresponding to depth information of the target area as a location of a virtual light source.

In order to achieve a purpose of enhancing an effect of the local image, the location of the virtual light source generally needs to be set according to a feature, such as a shape or an angle, of a target object. Generally, when a virtual light source is set for a specific target area, a location of the virtual light source is not unique. In a practical application, as long as the location of the virtual light source is located within a specific location range, the purpose of enhancing the effect of the local image can be achieved. The feature, such as a shape or an angle, of the target object in the local image is represented as depth information of a target area. If target areas have same or similar depth information, target objects also have a same or similar feature, such as a shape or an angle, and location ranges are generally the same or similar. If same or similar depth information is classified into a same depth type, there may be a preset location range corresponding to the depth type. When depth information of a target area belongs to the depth type, a location may be selected within the preset location range corresponding to the depth type as a location of a virtual light source such that the purpose of enhancing the effect of the local image can be achieved. Preset location ranges corresponding to a depth type and a specific depth type may be determined according to the prior art or a limited quantity of experiments.

It should be noted herein that, in a practical application, a preset location range set by a skilled person may be acquired, and then a location is selected within the preset location range as the location of the virtual light source, or a location that is of the virtual light source and is set by a skilled person may be directly acquired.

Figure 2C:
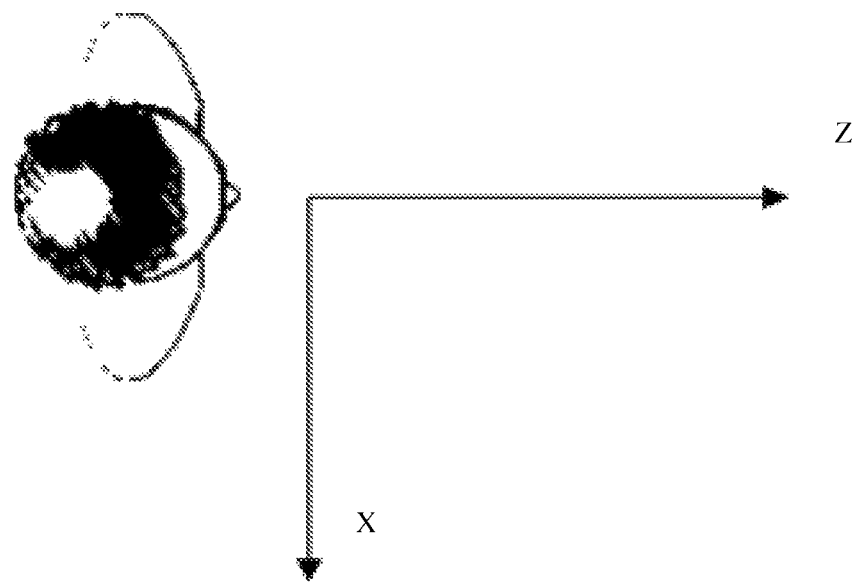
FIG. 2C is a schematic diagram of a three-dimensional coordinate system in an image rendering method according to another embodiment of the present disclosure.
Figure 2D:
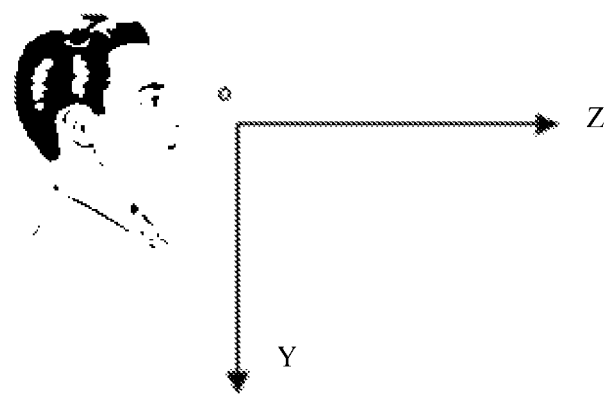
FIG. 2D is another schematic diagram of a three-dimensional coordinate system in an image rendering method according to another embodiment of the present disclosure.
Figure 2E:
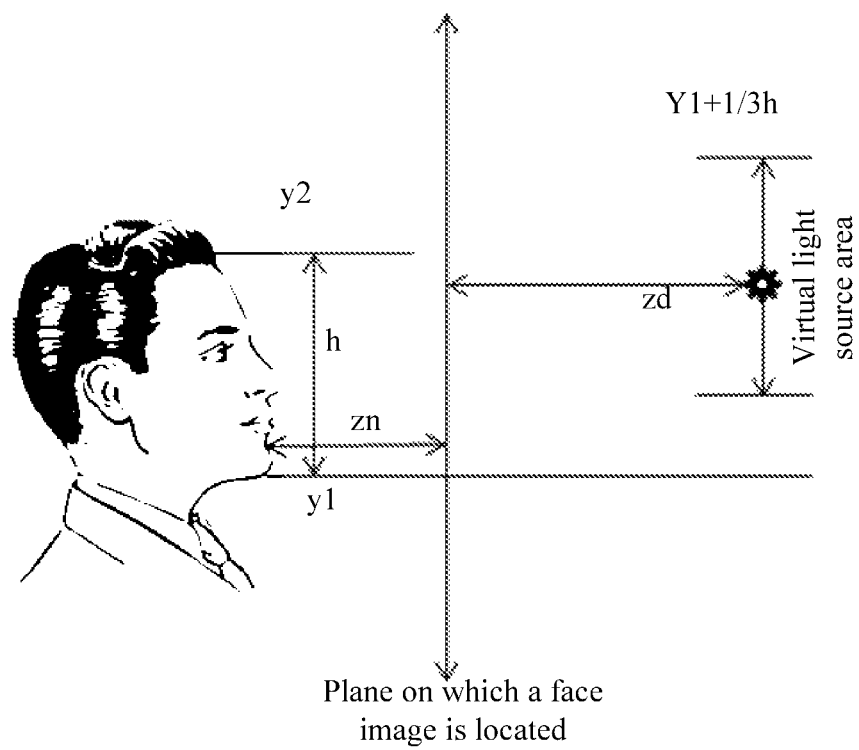
FIG. 2E is a schematic diagram of a location of a virtual light source in an image rendering method according to another embodiment of the present disclosure.
Figure 2F:
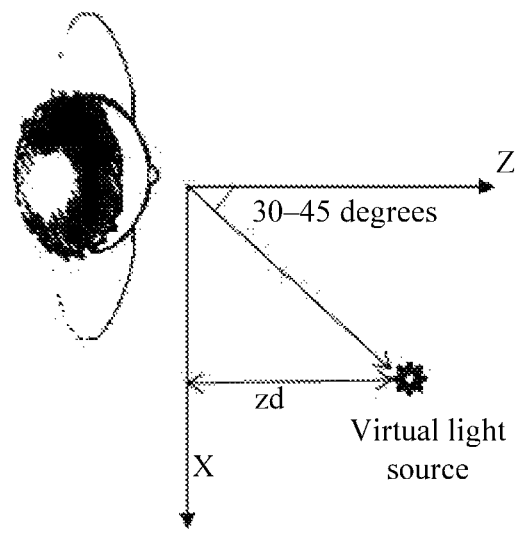
FIG. 2F is another schematic diagram of a location of a virtual light source in an image rendering method according to another embodiment of the present disclosure.

For example, if it may be determined that the depth information of the target area belongs to a type of front face image, a point may be selected within a preset location range corresponding to the front face image as a location of a virtual point light source. Furthermore, if the target area is a front face image, a coordinate system may be established by selecting a point in a nose tip image of the front face image as an origin o of a three-dimensional Cartesian coordinate system. As shown in FIG. 2C and FIG. 2D, in the coordinate system, a straight line that is in the target area, is parallel with a connection line between two eyes in the front face image, and passes through the origin of the coordinate system is used as an X axis. A straight line that is in the target area, is perpendicular to the X axis, and passes through the origin of the coordinate system is used as a Y axis, and a straight line that is perpendicular to the target area and passes through the origin of the coordinate system is used as a Z axis. In this coordinate system, a target pixel may be represented using a coordinate M (xn, yn, 0), a spatial point represented by the target pixel may be represented using a coordinate N (xn, yn, zn), where zn is depth information of the target pixel. A coordinate of the virtual light source may be represented using a coordinate D (xd, yd, zd). Value ranges of xd, yd, and zd constitute the preset location range corresponding to the front face image. It can be learned from experiments that the preset location range corresponding to the front face image is as follows. As shown in FIG. 2E, a coordinate range of the front face image on the Y axis is (y1, y2), and the value range of yd may be (y1+1/3h, y1+4/3h), where h=y2−y1, and as shown in FIG. 2F, an angle between a connection line of D and o and a plane constituted by the y axis and the z axis is 30-45 degrees, and a distance between the virtual light source and the target area, that is, a value of zd, is in direct proportion to h, and a ratio of zd to h is a constant.

Step 205: Select, for each target area, an illuminance ratio within a preset ratio range corresponding to the depth information of the target area as an illuminance ratio of the virtual light source.

In order to achieve the purpose of enhancing the effect of the local image, the illuminance ratio of the virtual light source generally also needs to be set according to the feature, such as a shape or an angle, of the target object. Being similar to the location of the virtual light source, if same or similar depth information is classified into a same depth type, there may be a preset ratio range corresponding to the depth type. When depth information of a target area belongs to the depth type, an illuminance ratio is selected within the preset ratio range corresponding to the depth type as the illuminance ratio of the virtual light source. Preset ratio ranges corresponding to a depth type and a specific depth type may be determined according to the prior art or a limited quantity of experiments.

For example, if it may be determined that the depth information of the target area belongs to a type of front face image, a point may be selected within a preset ratio range corresponding to the front face image as an illuminance ratio of a virtual point light source. Furthermore, the preset ratio range corresponding to the front face image is generally 1-1.25. When a value of the illuminance ratio of the virtual point light source falls within the preset ratio range, image texture of the front face image may be enhanced, and the front face image has a stereoscopic sense but does not have an obvious bright and dark face.

It should be noted herein that, in a practical application, a preset ratio range set by a skilled person may be acquired, and then an illuminance ratio is selected within the preset ratio range as the illuminance ratio of the virtual light source, or an illuminance ratio that is of the virtual light source and is set by a skilled person may be directly acquired.

It should be noted herein that, an execution sequence between step 204 and step 205 is not limited in this embodiment, and either of step 204 and step 205 may be first executed according to a requirement.

Step 206: Generate, for a target pixel of the target area, a gain factor under an action of the virtual light source.

A gain factor corresponding to each target pixel includes one or more sub-gain factors. A quantity of sub-gain factors is determined by a quantity of virtual light sources, and each sub-gain factor corresponds to one virtual light source. When there is only one virtual light source, the gain factor includes one sub-gain factor.

A sub-gain factor of a target pixel may be represented using $Y=K*R_1*R_2$. K represents an illuminance ratio of the virtual light source, $R_1$ represents a depth attenuation factor, and $$R_1 = \frac{1}{d^2},$$

and d represents depth information of the target pixel. Larger depth information d of the target pixel indicates a smaller value of $R_1$, which indicates that a longer distance to the virtual light source indicates a darker image. $R_2$ represents an angle attenuation factor, and $R_2=k'(1-\cos\theta)$, where k' represents a light ratio, and the light ratio refers to a received light ratio of a dark side to a bright side of a target object in the target area, and θ represents an incident angle, and the incident angle refers to an angle between an incident ray and a plane on which the local image is located. When the virtual light source is a virtual point light source, the incident ray refers to a connection line between the virtual light source and a spatial point represented by the target pixel. When the virtual light source is virtual parallel light, the incident ray refers to a connection line between a virtual sub-light source and the spatial point corresponding to the target pixel, where the virtual sub-light source refers to a part that is of the virtual parallel light and corresponds to the target pixel. Therefore, the sub-gain factor $Y=K*R_1*R_2$ of the target pixel may also be represented as $$Y = K * \frac{1}{d^2} * k'(1 - \cos\theta).$$

When the gain factor of the target pixel is to be calculated, a sub-gain factor of each target pixel may be calculated using a formula $$Y = K * \frac{1}{d^2} * k'(1 - \cos\theta),$$

and a product of the sub-gain factors is used as the gain factor of the target pixel. A value of k' may be acquired from the local image, or obtained by means of calculation according to the local image, and a specific obtaining manner is not further described herein. A value of θ may be obtained according to a relationship among the spatial point corresponding to the target pixel, the location of the virtual light source, and the plane on which the target area is located. For example, if the target pixel is represented using the coordinate M (xn, yn, 0), the spatial point represented by the target pixel may be represented using the coordinate N (xn, yn, zn), and a coordinate of a virtual point light source is represented using the coordinate D (xd, yd, zd), the value of θ may be obtained by means of calculation according to the foregoing coordinates. A specific calculation process is not further described herein.

When there are multiple virtual light sources, the gain factor of the target pixel may be a product of multiple sub-gain factors, or when there is only one virtual light source, the gain factor of the target pixel may be directly obtained by means of calculation using the formula $$Y = K * \frac{1}{d^2} * k'(1 - \cos\theta).$$

Step 207: Perform rendering on an initial color of the target pixel using the gain factor in order to obtain a rendered color of the target pixel.

Rendering performed on the initial color of the target pixel may be implemented by performing rendering on a color component of the initial color. Performing rendering on an initial color of each target pixel may further include the following steps: acquiring the initial color of the target pixel, generating a color component corresponding to the initial color, performing rendering on the corresponding color component of the target pixel using the gain factor in order to obtain a rendered component of the target pixel, and generating a rendered color of the target pixel using the rendered component of the target pixel.

For example, when a rendered color of a target pixel A is to be generated, a gain factor Ya corresponding to the target pixel A may be generated first. Then, an initial color RGB of the target pixel A is acquired. A color of the target pixel is split into a red component R, a green component G, and a blue component B, and then rendered color components R', G', B' are obtained by multiplying the gain factor by each value of R, G, and B, that is, R'=R*Ya, G'=G*Ya, B'=B*Ya, and then, a rendered color (RGB)' of the target pixel is generated using R', G', B'.

Step 208: Replace the initial color of the target pixel with the rendered color.

After the rendered color of the target pixel is generated, an initial color of each target pixel in the target area is replaced with a rendered color corresponding to the target pixel in order to obtain a rendered image. In a practical application, every time a rendered color of one target pixel is generated, an initial color of the target pixel may be replaced with the rendered color, or initial colors of all target pixels may be together replaced with rendered colors after the rendered colors of all the target pixels are generated.

It can be seen from the foregoing embodiment that, a target area is recognized from a to-be-rendered image. A virtual light source is set for the target area, and rendering is performed on the target area using the virtual light source. An enhancement on a to-be-rendered image is implemented using a virtual light source. Therefore, the virtual light source plays a rendering action only on a target area corresponding to the virtual light source, but does not affect another part of the to-be-rendered image. Virtual light sources that are set for different target areas do not interfere with each other, and therefore an image effect of the to-be-rendered image can be relatively good.

In addition, by improving the effect of the to-be-rendered image using this embodiment, unlike in the prior art, it is not necessary to arrange light sources of different types at different angles of a local conference room, but only a diffuse light source may be used to provide basic lighting for the local conference room in order to simplify a requirement of light source setting of the local conference room. By providing basic lighting for the local conference room using only the diffuse light source, use of a hard light source, such as a spotlight, in the conference room may be reduced, and a possibility that high heat and a high brightness of the light source cause a conference participant to feel uncomfortable is reduced.

Corresponding to the image rendering method in the present disclosure, the present disclosure further provides an image rendering apparatus.

Figure 3A:
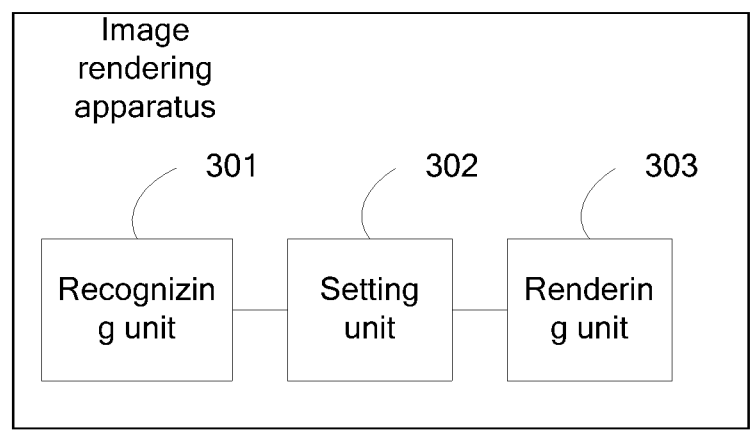
FIG. 3A is a block diagram of an image rendering apparatus according to an embodiment of the present disclosure.

Referring to FIG. 3A, FIG. 3A is a block diagram of an embodiment of an image rendering apparatus according to the present disclosure.

The apparatus includes a recognizing unit 301, a setting unit 302, and a rendering unit 303.

The recognizing unit 301 is configured to recognize a target area from a local image.

In a practical application, the recognizing unit 301 may recognize the target area from the local image using an image recognition algorithm with reference to an application environment, or may recognize the target area according to a preset condition.

The setting unit 302 is configured to set a virtual light source for the target area recognized by the recognizing unit 301.

Figure 3B:
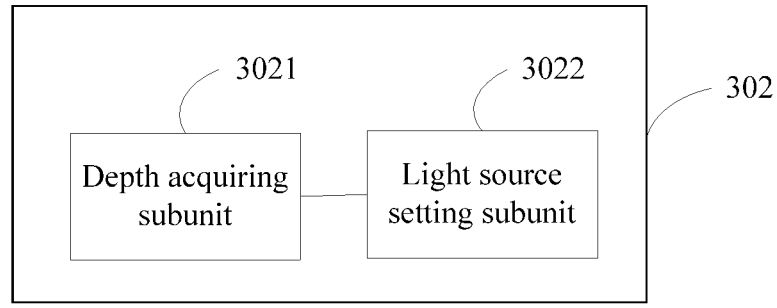
FIG. 3B is a block diagram of a setting unit of an image rendering apparatus according to an embodiment of the present disclosure.

When the setting unit 302 sets the virtual light source for the target area, a location of the virtual light source and an illuminance ratio of the virtual light source mainly need to be set. Therefore, as shown in FIG. 3B, the setting unit 302 may include a depth acquiring subunit 3021 and a light source setting subunit 3022.

Figure 3C:
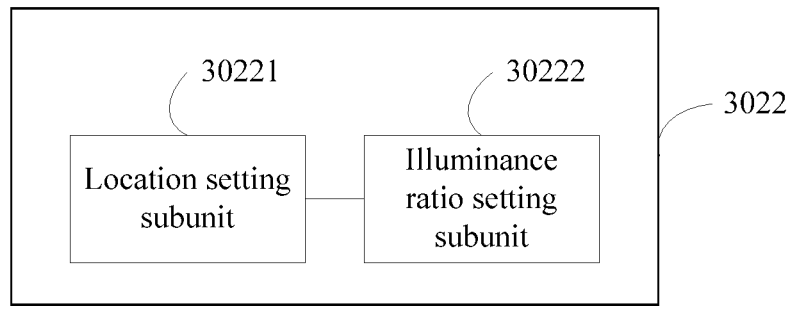
FIG. 3C is a block diagram of a light source setting subunit of an image rendering apparatus according to an embodiment of the present disclosure.

When the virtual light source is to be set for the target area, the depth acquiring subunit 3021 acquires depth information of the target area, and the light source setting subunit 3022 sets the virtual light source for the target area according to the depth information acquired by the depth acquiring subunit 3021. When setting the virtual light source for the target area according to the depth information acquired by the depth acquiring subunit 3021, the light source setting subunit 3022 may select a location within a preset location range corresponding to the depth information as the location of the virtual light source, and select an illuminance ratio within a preset ratio range corresponding to the depth information as the illuminance ratio of the virtual light source. Therefore, as shown in FIG. 3C, the light source setting subunit 3022 may include a location setting subunit 30221 that is configured to select a location within the preset location range according to the depth information as the location of the virtual light source, and an illuminance ratio setting subunit 30222 that is configured to select an illuminance ratio within the preset ratio range according to the depth information as the illuminance ratio of the virtual light source.

Figure 3D:
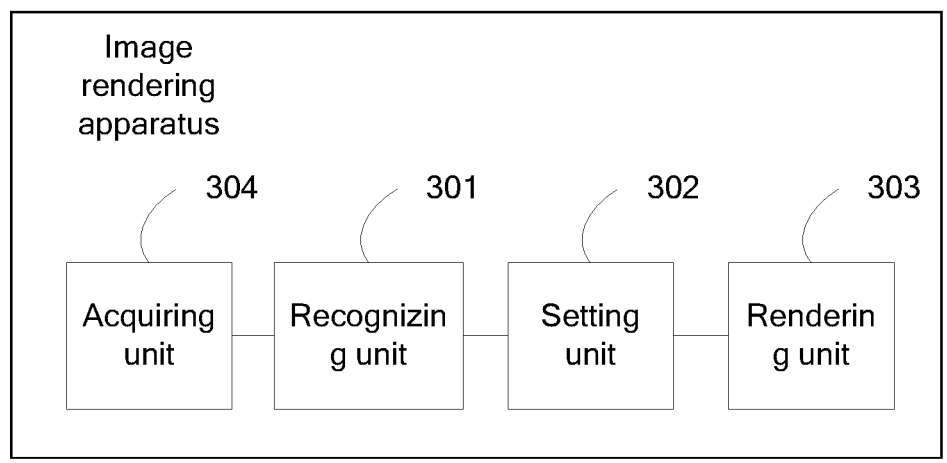
FIG. 3D is another block diagram of an image rendering apparatus according to an embodiment of the present disclosure.

To increase a processing speed, as shown in FIG. 3D, the apparatus may further include an acquiring unit 304. The acquiring unit 304 is configured to acquire the local image that includes the depth information. When the local image includes pixel depth information, the depth acquiring subunit 3021 may directly acquire the depth information of the target area from the local image. When the local image does not include the depth information, the depth acquiring subunit 3021 may obtain the depth information of the target area by means of calculation according to a color of the local image.

The rendering unit 303 is configured to perform rendering on the target area using the virtual light source set by the setting unit 302.

Figure 3E:
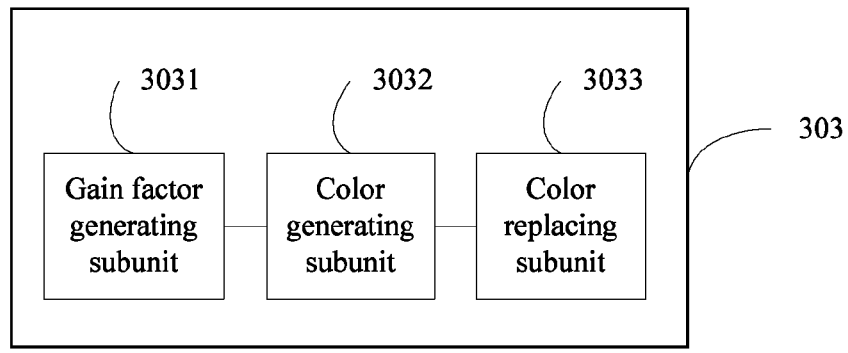
FIG. 3E is a block diagram of a rendering unit of an image rendering apparatus according to an embodiment of the present disclosure.

To perform rendering on the target area, rendering may be performed on target pixels one by one using the virtual light source. Correspondingly, as shown in FIG. 3E, the rendering unit 303 may include a gain factor generating subunit 3031, a color generating subunit 3032, and a color replacing subunit 3033.

The gain factor generating subunit 3031 is configured to generate, for a target pixel constituting the target area, a gain factor under an action of the virtual light source.

When there is only one virtual light source, the gain factor generating subunit 3031 may generate a gain factor for each target pixel using a formula $$Y = K * \frac{1}{d^2} * k'(1 - \cos\theta),$$

where K represents an illuminance ratio of the virtual light source, d represents depth information of the target pixel, k' represents a light ratio of the target area, and θ represents an incident angle.

Figure 3F:
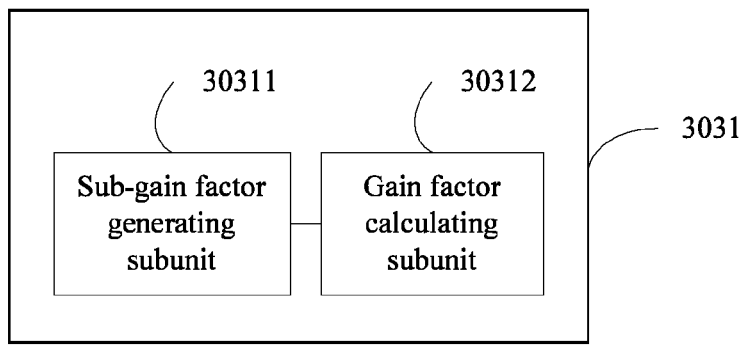
FIG. 3F is a block diagram of a gain factor generating subunit of an image rendering apparatus according to an embodiment of the present disclosure.

When there are multiple virtual light sources, a sub-gain factor corresponding to each of the virtual light sources may be calculated using a formula $$Y = K * \frac{1}{d^2} * k'(1 - \cos\theta),$$

and then a product of the sub-gain factors is used as the gain factor. As shown in FIG. 3F, the gain factor generating subunit 3031 may include a sub-gain factor generating subunit 30311 and a gain factor calculating subunit 30312. The sub-gain factor generating subunit 30311 is configured to generate, for the target pixel, a sub-gain factor under an action of each of the virtual light sources using a formula $$K * \frac{1}{d^2} * k'(1 - \cos\theta)$$

when there are multiple virtual light sources, where K represents an illuminance ratio of the virtual light source, d represents depth information of the target pixel, k' represents a light ratio of the target area, and θ represents an incident angle, and the gain factor calculating subunit 30312 is configured to use a product of the sub-gain factors generated by the sub-gain factor generating subunit as the gain factor of the target pixel.

Figure 3G:
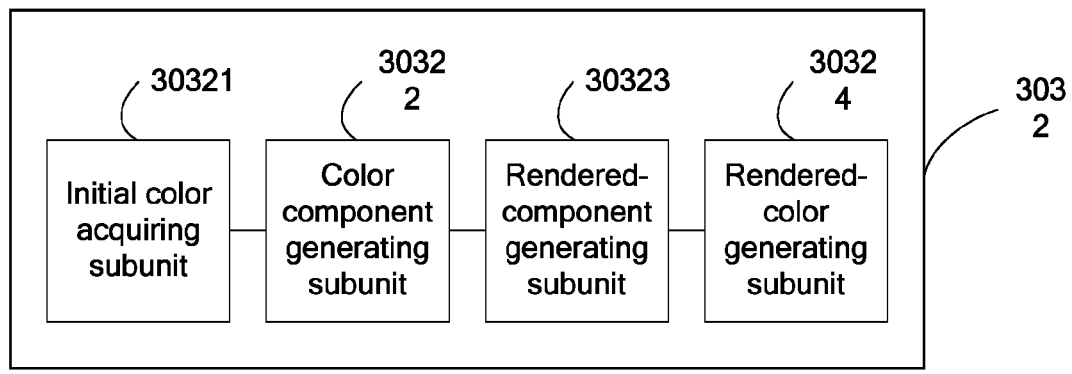
FIG. 3G is a block diagram of a color generating subunit of an image rendering apparatus according to an embodiment of the present disclosure.

The color generating subunit 3032 is configured to perform rendering on a corresponding initial color of the target pixel using the gain factor generated by the gain factor generating subunit 3031 in order to obtain a rendered color of the target pixel. As shown in FIG. 3G, the color generating subunit 3032 may include an initial color acquiring subunit 30321, a color component generating subunit 30322, a rendered-component generating subunit 30323, and a rendered-color generating subunit 30324. The initial color acquiring subunit 30321 is configured to acquire the initial color of the target pixel. The color component generating subunit 30322 is configured to generate a color component corresponding to the initial color acquired by the initial color acquiring subunit. The rendered-component generating subunit 30323 is configured to perform rendering on the corresponding color component of the target pixel using the gain factor in order to obtain a rendered component of the target pixel, where the color component is generated by the color component generating subunit, and the rendered-color generating subunit 30324 is configured to generate the rendered color of the target pixel using the rendered component of the target pixel, where the rendered component is generated by the rendered-component generating subunit.

The color replacing subunit 3033 is configured to replace the initial color of the target pixel with the rendered color corresponding to the target pixel, where the rendered color is generated by the color generating subunit 3032.

It can be seen from the foregoing embodiment that, an enhancement on a to-be-rendered image is implemented using a virtual light source. Therefore, the virtual light source plays a rendering action only on a target area corresponding to the virtual light source, but does not affect another part of the to-be-rendered image such that an image effect of the to-be-rendered image can be relatively good.

In addition, by improving the effect of the to-be-rendered image using this embodiment, unlike in the prior art, it is not necessary to arrange light sources of different types at different angles of a local conference room, but only a diffuse light source may be used to provide basic lighting for the local conference room in order to simplify a requirement of light source setting of the local conference room. By providing basic lighting for the local conference room using only the diffuse light source, use of a hard light source, such as a spotlight, in the conference room may be reduced, and a possibility that high heat and a high brightness of the light source cause a conference participant to feel uncomfortable is reduced.

Figure 4:
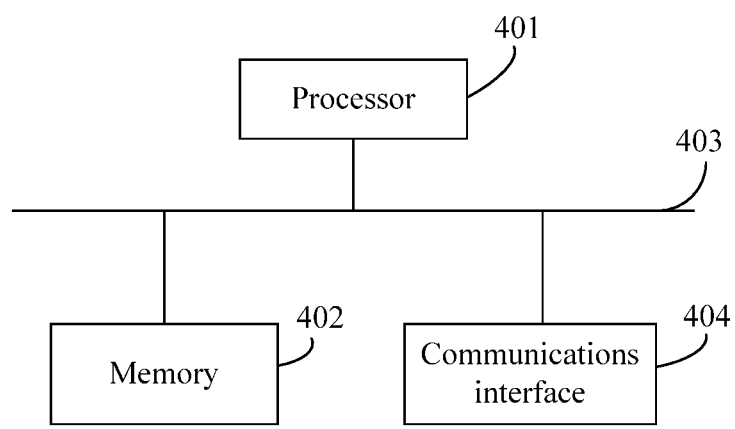
FIG. 4 is a schematic structural diagram of a server according to an embodiment of the present disclosure.

Referring to FIG. 4, FIG. 4 is a schematic structural diagram of an embodiment of a server according to the present disclosure.

It can be learned from FIG. 4 that, in specific implementation, the server in this embodiment of the present disclosure may include physical modules, such as a processor 401, a memory 402, a bus 403, and a communications interface 404. The memory 402 is configured to store a computer execution instruction. The processor 401, the memory 402, and the communications interface 404 are connected using the bus 403. When the server runs, the processor 401 executes the computer execution instruction stored by the memory 402, and communicates with a terminal device using the communications interface 404 such that the server executes the image rendering method in each embodiment of the present disclosure. The processor 401 may be a central processing unit (CPU), an application-specific integrated circuit (ASIC), or the like. The memory 402 may include an entity that has a storage function, such as a random access memory (RAM), a read-only memory (ROM), or a magnetic disk.

In specific implementation, this embodiment of the present disclosure further provides a computer storage medium, where the computer storage medium may store a program, and when the program is executed, a part or all of steps in each embodiment and is provided in the present disclosure may be executed. The storage medium may be a magnetic disk, an optical disc, a ROM, or a RAM.

A person skilled in the art may clearly understand that, the technologies in the embodiments of the present disclosure may be implemented by software in addition to a necessary general hardware platform. Based on such an understanding, the technical solutions in the embodiments of the present disclosure essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly. For related parts, reference may be made to the description in the part of the method embodiment.

The foregoing descriptions are implementation manners of the present disclosure, but are not intended to limit the protection scope of the present disclosure. Any modification, equivalent replacement, and improvement made without departing from the principle of the present disclosure shall fall within the protection scope of the present disclosure.

What is claimed is:

1. An image rendering method, comprising:
recognizing a target area from a to-be-rendered image;
setting a virtual light source for the target area according to depth information of the target area, wherein setting the virtual light source for the target area according to the depth information comprises selecting, for each target area, an illuminance ratio within a present ratio range corresponding to the depth information of the target area as an illuminance ratio of the virtual light source;
selecting, for the target area, a location within a preset location range corresponding to the depth information of the target area as a location of the virtual light source; and
performing rendering on the target area using the virtual light source.

2. The method according to claim 1, wherein setting the virtual light source for the target area comprises acquiring the depth information of the target area.

3. The method according to claim 1, wherein before recognizing the target area from the to-be-rendered image, the method further comprises acquiring the to-be-rendered image that comprises the depth information.

4. The method according to claim 3, wherein acquiring the to-be-rendered image that comprises the depth information further comprises cooperatively acquiring, using a depth camera and a color camera, the to-be-rendered image that comprises the depth information.

5. The method according to claim 2, wherein acquiring depth information of the target area comprises obtaining the depth information of the target area by means of calculation according to a color of the to-be-rendered image.

6. An image rendering method, comprising:
recognizing a target area from a to-be-rendered image;
setting a virtual light source for the target area according to depth information of the target area;
selecting, for the target area, a location within a preset location range corresponding to the depth information of the target area as a location of the virtual light source; and
performing rendering on the target area using the virtual light source, wherein performing rendering on the target area using the virtual light source comprises:
generating, for a target pixel of the target area, a gain factor under an action of the virtual light source;
performing rendering on an initial color of the target pixel using the gain factor in order to obtain a rendered color of the target pixel; and
replacing the initial color of the target pixel with the rendered color.

7. The method according to claim 6, wherein generating, for the target pixel of the target area, the gain factor under the action of the virtual light source comprises generating a gain factor $$K * \frac{1}{d^2} * k'(1 - \cos\theta)$$

for the target pixel when there is one virtual light source, wherein K represents the illuminance ratio of the virtual light source, wherein d represents depth information of vie target pixel, wherein k' represents a light ratio of the target area, and wherein θ represents an incident angle.

8. The method according to claim 6, wherein generating, for the target pixel of the target area, the gain factor under the action of the virtual light source comprises:
generating, for the target pixel, a sub-gain factor under the action of each of the virtual light sources using a formula $$K * \frac{1}{d^2} * k'(1 - \cos\theta)$$

when there are multiple of the virtual light sources, wherein K represents the illuminance ratio of the virtual light source, wherein d represents depth information of the target pixel, wherein k' represents a light ratio of the target area, and wherein θ represents an incident angle; and
using a product of the sub-gain factors as the gain factor of the target pixel.

9. The method according to claim 6, wherein performing rendering on the initial color of the target pixel using the gain factor in order to obtain the rendered color of the target pixel comprises:
acquiring, for each target pixel, the initial color of the target pixel;
generating a color component corresponding to the initial color;
performing rendering on the color component of the target pixel using the gain factor in order to obtain a rendered component of the target pixel; and
generating the rendered color of the target pixel using the rendered component of the target pixel.

10. An image rendering apparatus, comprising:
a memory; and
a processor coupled to the memory and configured to:
recognize a target area from a local image;
set a virtual light source for the target area according to depth information of the target area;
select, for the target area, a location within a preset location range corresponding to the depth information of the target area as a location of the virtual light source;
select an illuminance ratio within a preset ratio range corresponding to the depth information as an illuminance ratio of the virtual light source; and
perform rendering on the target area using the virtual light source.

11. The apparatus according to claim 10, wherein the processor is further configured to acquire depth information of the target area.

12. The apparatus according to claim 10, wherein the processor is further configured to acquire the local image that comprises the depth information.

13. The apparatus according to claim 12, wherein the processor is further configured to cooperatively acquire, using a depth camera and a color camera, the local image that comprises the depth information.

14. The apparatus according to claim 11, wherein the processor is further configured to obtain the depth information of the target area by means of calculation according to a color of the local image.

15. An image rendering apparatus, comprising:
a memory; and
processor coupled to the memory and configured to:
recognize a target area from a local image;
set a virtual light source for the target area according to depth information of the target area;
select, for the target area, a location within a preset location range corresponding to the depth information of the target area as a location of the virtual light source;
generate, for a target pixel of the target area, a gain factor under an action of the virtual light source;
perform rendering on the target area using the virtual light source by performing rendering on an initial color of the target pixel using the gain factor generated in order to obtain a rendered color of the target pixel; and
replace the initial color of the target pixel with the rendered color of the target pixel.

16. The apparatus according to claim 15, wherein the processor is further configured to generate a gain factor $$K * \frac{1}{d^2} * k'(1 - \cos\theta)$$

for the target pixel when there is one virtual light source, wherein K represents the illuminance ratio of the virtual light source, wherein d represents depth information of the target pixel, wherein k' represents a light ratio of the target area, and wherein θ represents an incident angle.

17. The apparatus according to claim 15, wherein the processor is further configured to:
generate, for the target pixel, a sub-gain factor under the action of each of the virtual light sources using a formula $$K * \frac{1}{d^2} * k'(1 - \cos\theta)$$

when there are multiple of the virtual light sources, wherein K represents the illuminance ratio of the virtual light source, wherein d represents depth information of the target pixel, wherein k' represents a light ratio of the target area, and wherein θ represents an incident angle; and
use a product of the sub-gain factors generated as the gain factor of the target pixel.

18. The apparatus according to claim 15, wherein the processor is further configured to:
acquire the initial color of the target pixel;
generate a color component corresponding to the initial color acquired;
perform, using the gain factor, rendering on the color component generated in order to obtain a rendered component of the target pixel; and
generate the rendered color of the target pixel using the rendered component that is of the target pixel.

* * * * *

UNITED STATES PATENT AND TRADEMARK OFFICE
CERTIFICATE OF CORRECTION

PATENT NO. : 9,805,501 B2
APPLICATION NO. : 15/157679
DATED : October 31, 2017
INVENTOR(S) : Chuanna Huang et al.

Page 1 of 1

It is certified that error appears in the above-identified patent and that said Letters Patent is hereby corrected as shown below:

In the Claims

Column 18, Lines 64-67, through Column 19, Lines 1-9, Claim 7 should read:
7. The method according to claim 6, wherein generating, for the target pixel of the target area, the gain factor under the action of the virtual light source comprises generating a gain factor $$K * \frac{1}{d^2} * k'(1 - \cos\theta)$$

for the target pixel when there is one virtual light source, wherein K represents the illuminance ratio of the virtual light source, wherein d represents depth information of the target pixel, wherein k' represents a light ratio of the target area, and wherein θ represents an incident angle.

Signed and Sealed this
Second Day of January, 2018

Joseph Matal
*Performing the Functions and Duties of the*
*Under Secretary of Commerce for Intellectual Property and*
*Director of the United States Patent and Trademark Office*